United States Patent
Boregowda et al.

(10) Patent No.: US 11,732,804 B2
(45) Date of Patent: Aug. 22, 2023

(54) HYDRAULIC TOOL MOUNT AND SEALING PISTON FOR SUCH A MOUNT

(71) Applicant: Kennametal Inc., Latrobe, PA (US)

(72) Inventors: Santhosha Boregowda, Karnataka (IN); Josef Konrad Herud, Herzogenaurach (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 17/066,883

(22) Filed: Oct. 9, 2020

(65) Prior Publication Data

US 2021/0108728 A1 Apr. 15, 2021

(30) Foreign Application Priority Data

Oct. 11, 2019 (DE) .......................... 102019215695.9

(51) Int. Cl.
*F16J 15/32* (2016.01)
*F16J 15/3236* (2016.01)
(Continued)

(52) U.S. Cl.
CPC ......... *F16J 15/3236* (2013.01); *B23B 31/302* (2013.01); *F16J 15/3204* (2013.01)

(58) Field of Classification Search
CPC .. F16J 15/3226; F16J 15/3236; F16J 15/3204; F16J 15/56; B25B 5/087; B23B 31/302
See application file for complete search history.

(56) References Cited

U.S. PATENT DOCUMENTS 2,963,298 A * 12/1960 Wharton ............... B23B 31/305
279/157
3,040,712 A * 6/1962 Harrah ..................... F16J 10/02
91/394
(Continued)

FOREIGN PATENT DOCUMENTS

CN 101157144 A 4/2008
CN 205165940 U 4/2016
(Continued)

OTHER PUBLICATIONS

Jun. 22, 2020 Office Action, DE 1020192156959, 12 pgs.
(Continued)

*Primary Examiner* — Eugene G Byrd
*Assistant Examiner* — L. Susmitha Koneru
(74) *Attorney, Agent, or Firm* — Christopher J. Owens

(57) ABSTRACT

The invention relates to a hydraulic tool mount having a bore into which a sealing piston is inserted, wherein the sealing piston comprises a pin, a seal and a head which are arranged one behind the other in an axial direction (A) and thus form a stack, wherein the seal comprises a circumferential sealing lip for abutment and sealing against an inner wall of the bore in order to achieve a first sealing effect, and the bore comprises a sealing seat which, when the sealing piston is inserted, forms a stop for the head in axial direction (A), so that, in an end position of the sealing piston, the head abuts the sealing seat and thereby closes the bore in order to achieve a second sealing effect. The invention further relates to a corresponding sealing piston.

15 Claims, 2 Drawing Sheets

(51) Int. Cl.
*F16J 15/3204* (2016.01)
*B23B 31/30* (2006.01)

(56) References Cited

U.S. PATENT DOCUMENTS

| | | | | |
|---|---|---|---|---|
| 3,130,978 | A * | 4/1964 | Van Roojen | B23C 5/26 409/231 |
| 3,250,542 | A * | 5/1966 | Winnen | B23B 31/305 279/2.08 |
| 3,364,454 | A * | 1/1968 | Froebe | H01C 10/38 338/183 |
| 3,516,681 | A * | 6/1970 | Cox | B23B 31/305 279/4.03 |
| 3,592,482 | A | 7/1971 | Better et al. | |
| 3,731,942 | A * | 5/1973 | Buck | B23B 31/204 279/4.06 |
| 3,770,287 | A * | 11/1973 | Weber | B23B 31/402 242/576.1 |
| 3,989,260 | A * | 11/1976 | Zonkov | B23B 31/1175 279/158 |
| 4,207,807 | A * | 6/1980 | Takata | F15B 15/1438 92/170.1 |
| 4,543,970 | A * | 10/1985 | Noh | B23Q 11/0042 134/76 |
| 4,647,012 | A * | 3/1987 | Gartner | F02M 61/145 285/23 |
| 4,944,215 | A * | 7/1990 | Nimmo | F15B 15/1433 92/170.1 |
| 5,199,508 | A * | 4/1993 | Miyanaga | B25D 17/088 279/157 |
| 5,251,912 | A * | 10/1993 | Rinne | F16J 15/46 277/926 |
| 5,251,915 | A * | 10/1993 | Meernik | F16J 9/203 277/457 |
| 5,516,243 | A | 5/1996 | Laube | |
| 5,538,256 | A * | 7/1996 | Rinne | F16J 15/186 277/467 |
| 5,806,841 | A * | 9/1998 | Hebener | B23B 31/302 269/157 |
| 5,836,235 | A * | 11/1998 | Rudiger | B60T 11/16 92/256 |
| 5,873,687 | A * | 2/1999 | Watanabe | B23B 31/11 279/155 |
| 5,911,443 | A * | 6/1999 | Le Quere | F16L 37/0915 285/379 |
| 6,012,712 | A * | 1/2000 | Bernstein | B25B 1/2405 269/254 CS |
| 7,914,010 | B2 * | 3/2011 | Herud | B23B 31/305 279/4.06 |
| 8,516,813 | B2 * | 8/2013 | Johansson | F16J 15/186 60/525 |
| 9,079,254 | B2 * | 7/2015 | Schuffenhauer | B23B 31/305 |
| 2006/0228166 | A1 * | 10/2006 | Balsells | F16C 11/069 403/57 |
| 2007/0145692 | A1 * | 6/2007 | Herud | B23B 31/305 279/2.06 |
| 2011/0175300 | A1 * | 7/2011 | Schuffenhauer | B23B 31/305 279/4.06 |
| 2012/0325275 | A1 * | 12/2012 | Goodman | H01L 21/68728 269/157 |
| 2019/0001420 | A1 | 1/2019 | Teusch et al. | |

FOREIGN PATENT DOCUMENTS

| | | |
|---|---|---|
| CN | 105562747 A | 5/2016 |
| DE | 2405506 A1 | 8/1974 |
| DE | 3417430 A1 | 11/1985 |
| DE | 69113984 T2 | 3/1996 |
| DE | 102017002144 A1 | 9/2017 |
| EP | 0272730 A1 | 6/1988 |
| EP | 2008748 A3 | 4/2009 |
| EP | 1737594 B1 | 3/2010 |
| WO | WO1995029029 A1 | 11/1995 |
| WO | 9626041 A2 | 8/1996 |

OTHER PUBLICATIONS

Aug. 30, 2022 Examination notification CN App. No. 112643073A.
Apr. 15, 2023 Foreign Office Action Chinese Application No. CN202011079348.6, 19 Pages.

* cited by examiner

HYDRAULIC TOOL MOUNT AND SEALING PISTON FOR SUCH A MOUNT

RELATED APPLICATION DATA

The present application claims priority pursuant to 35 U.S.C. § 119(a) to German Patent Application Number 102019215695.9 filed Oct. 11, 2019 which is incorporated herein by reference in its entirety.

FIELD

The invention relates to a hydraulic tool mount and a sealing piston for such a tool mount.

BACKGROUND

A hydraulic tool mount holds a tool or a workpiece by means of hydraulic pressure. One example of a tool mount is an expansion chuck. For clamping or unclamping the tool or workpiece, the tool mount comprises an expansion sleeve with a wall and a pressure chamber containing a fluid. The pressure chamber is accessible via a bore in the tool mount. A sealing piston is inserted into this bore, by means of which pressure is exerted on the fluid and thus on the wall. The pressure, and consequently also the clamping of the tool or the workpiece in or on the expansion sleeve, can be adjusted by moving the sealing piston in the bore, e.g. by screwing it in or out. Accordingly, more or less pressure is exerted.

EP 1 737 594 B1 and DE 10 2017 002 144 A1 include examples of hydraulic expansion chucks and the associated sealing pistons.

The tightness of the sealing piston inside the bore of the tool mount is of key importance to the optimum operation thereof. Leakage of the fluid out of the pressure chamber should be avoided as much as possible. But, since the sealing piston has to be movable, a seal is difficult to achieve; especially since the repetitive movement of the sealing piston when clamping and unclamping a tool or workpiece causes the sealing piston to wear out over time, as a result of which the sealing effect decreases.

SUMMARY

With this in mind, an object of the invention is to provide an improved hydraulic tool mount and a sealing piston for use in such a tool mount. The sealing piston should ensure the greatest possible tightness for as long as possible.

According to the invention, the object is achieved by a tool mount having the features according to claim 1 and by a sealing piston having the features according to claim 13. Advantageous configurations, further developments, and variants are the subject matter of the subclaims. The explanations relating to the tool mount apply analogously to the sealing piston and vice versa.

The hydraulic tool mount has a bore into which a sealing piston is inserted. The sealing piston seals a pressure chamber of the tool mount from the environment. The sealing piston can be moved in the bore, as a result of which, depending on the direction, the tool mount can be clamped and released. A fluid is disposed in the pressure chamber, which itself presses on a wall, e.g. an expansion sleeve, in which a tool or workpiece can be clamped. The tool mount is therefore also referred to as an expansion chucking device. The fluid is an oil, for example. By moving the sealing piston into or out of the bore, pressure is correspondingly exerted on the fluid and the wall, as well as on a tool or workpiece clamped therein or thereon.

In the present case, without loss of generality, it is assumed that the tool mount is an expansion chuck comprising an in particular cylindrical expansion sleeve, which surrounds a cavity into which a tool or workpiece can be inserted and in which the tool or workpiece can be clamped by actuating the sealing piston.

The sealing piston comprises a pin, a seal and a head which are arranged one behind the other in an axial direction and thus form a stack. The pin, the seal and the head all extend in axial direction, i.e. along a longitudinal axis, and are preferably rotationally symmetric with respect to this axis. The pin, the seal and the head are preferably arranged directly one behind the other, so that both the head and the pin abut the seal on opposite sides thereof.

The pin is in particular used to actuate the sealing piston from the outside. The tool mount preferably comprises an actuator, which is also seated in the bore, e.g. a screw, which is seated in a thread of the bore. The actuator presses on the pin so that the sealing piston can be moved in and out by actuating the actuator. The actuator accordingly expediently comprises a tool engagement feature for actuation from the outside.

The seal comprises a circumferential sealing lip for abutment and sealing against an inner wall of the bore in order to achieve a first sealing effect. The sealing lip is preferably ring-shaped. The sealing lip in particular protrudes in radial direction relative to the rest of the sealing piston. In the inserted state, the sealing lip abuts the inner wall; when the sealing piston is moved, the sealing lip drags along the inner wall. Overall, this results in the first sealing effect. When viewed in cross-section along the axial direction, the sealing lip protrudes relative to the rest of the seal and has a generally convex, i.e. outward-facing, profile. In one suitable configuration, the sealing lip is wedge-shaped. A, for example curved, sealing lip is suitable as well.

In the present case, the bore comprises a sealing seat which, when the sealing piston is inserted, forms a stop for the head in axial direction, so that, in an end position of the sealing piston, the head abuts the sealing seat and thereby closes the bore in order to achieve a second sealing effect. When the sealing piston is inserted, i.e. when the tool mount is clamped, the sealing piston as a whole is moved inward until the head hits the sealing seat. It is not possible to move the head beyond the sealing seat. The head then closes the bore at the level of the sealing seat, thus relieving the load on the seal. An advantageous relieving of the load on the seal begins as soon as the head approaches the sealing seat, because the head closes the bore more and more as it is moved inward and the pressure of the pressure chambers acts more on the head and less on the seal. In the end position, the head then abuts the sealing seat in a sealing manner.

A key aspect of the invention is the double sealing effect, which is realized by combining the seal that abuts the inner wall with an additional seal, namely the head that abuts the sealing seat. The seal here produces a first sealing effect, which is combined with a second sealing effect of the head. When clamping the tool mount, the sealing piston is moved inward in the bore, thus building up pressure. This pressure acts on the seal, more precisely on the sealing lip, which is correspondingly stressed. As the insertion progresses, however, the head closes the bore and correspondingly absorbs pressure, so that the load on the seal is accordingly advantageously relieved. In the end position, the pressure of the pressure chamber is in particular completely on the head and the load on the seal is accordingly relieved. In the clamped state, i.e. while a tool or workpiece is being clamped or unclamped, and in particular also during machining, the seal is predominantly or completely free of pressure. The wear on the seal, especially the sealing lip, is thus significantly reduced and the sealing piston has a correspondingly improved service life. So-called micro-leakage of fluid from the pressure chamber through the bore to the outside is also advantageously reduced by the double sealing effect.

In one suitable configuration, the sealing seat is formed as a result of the fact that the bore comprises an outer section in which the sealing piston is seated and an inner section that is tapered relative to the outer section and thus has a diameter that is smaller than a diameter of the head. The bore as a whole is therefore tapered. In other words: when viewed in cross-section along the axial direction, the bore has a step that forms the sealing seat. This makes the sealing seat particularly stable. In principle, however, a variant is also possible and suitable in which the sealing seat is configured as only a ring in the bore, so that the bore does not continue inward with a tapered diameter, but rather widens again after the sealing seat. In one suitable configuration, the sealing seat and specifically the entire inner section has a diameter (i.e. inner diameter) that is at least 50% and at most 80% of the diameter of the outer section.

The sealing seat is preferably ring-shaped and the front of the head is configured such that, in the end position, it rests in the sealing seat in a form-locking manner.

Consequently, in the end position there is a form fit between the head and the sealing seat, as a result of which the bore is particularly optimally closed and sealed. The head and the sealing seat are in particular configured to be complementary to one another.

In a preferred configuration, the front of the head is spherical or cone-shaped for form-locking abutment on the sealing seat in the end position. Such a geometry of the head is particularly easy to produce and also ensures an optimum form fit in conjunction with the sealing seat. The head is thus configured as a ball seal or as a cone seal. The sealing seat is expediently funnel-shaped or cone-shaped, so that the sealing seat extends obliquely inward and the head is advantageously automatically optimally centered in the sealing seat. In combination with a ring-shaped sealing seat, the spherical or conical shape of the head results in a particularly good sealing effect.

The back of the head, i.e. toward the outside and toward the seal, is preferably plate-shaped and has a flat contact surface that abuts the seal. This advantageously results in a distribution of the force from the head to the seal over a large area, especially when the front of the head is spherical or conical, i.e. tapered toward the front. The contact surface extends in particular perpendicular to the axial direction.

Alternatively, or additionally, in one advantageous configuration, the pin comprises a flat contact surface that abuts the seal. The seal is expediently enclosed on both sides by the pin and head and disposed, in particular pinched, between two respectively flat contact surfaces. The seal also comprises contact surfaces that are in particular configured to be complementary to the contact surfaces of the pin and the head.

The seal preferably consists of an elastic material, in particular a plastic, so that the seal adapts optimally to the bore and thereby seals the pressure chamber. Expediently, the material generally has the best possible chemical resistance, especially to the fluid in the pressure chamber, as well as the best possible wear resistance, temperature resistance, formability with regard to manufacturing, elasticity with regard to insertion into the bore, service life and sealing effect, and also friction properties, especially relative to the inner wall of the bore. The seal is in particular rotationally symmetric with respect to the longitudinal axis. The seal is preferably manufactured in one piece, i.e. monolithic. The seal is preferably produced using an injection molding process and is therefore then an injection molded part.

The head preferably consists of a rigid material, preferably a metal, in particular steel. The head is in particular rotationally symmetric with respect to the longitudinal axis. The head is suitably made of a similar or the same material as the inner wall of the bore, especially the sealing seat thereof. Neither the sealing seat nor the head are therefore made of an elastic material, but rather of a rigid material, as a result of which the seal is particularly robust and wear-resistant.

The pin preferably consists of a rigid material, preferably a metal, in particular steel. The explanations relating to the head also apply accordingly to the pin. The pin is in particular rotationally symmetric with respect to the longitudinal axis and is expediently a cylinder. The pin is preferably manufactured in one piece, i.e. monolithic.

The head and the pin are expediently manufactured with play in relation to the bore, so that both can be moved along the bore with as little friction as possible, but still in a guided manner.

A configuration in which the seal is made of a material, the elasticity of which is greater than that of the pin and the head, is particularly preferred. Configurations in which the elasticity of the seal is greater than that of the pin or the head are generally advantageous as well. Therefore, when clamping the tool mount, the seal is primarily compressed and squeezed between the pin and the head. Because the seal is elastic in comparison to the head and the pin, the length of the sealing piston is variable. A particular advantage of the elastic seal is in particular that it absorbs tolerances that result from the production of the sealing piston and the bore. In one suitable configuration, the seal is so elastic that it allows a change in length in the range from 0.1 mm to 1 mm, preferably 0.5 mm.

In one suitable configuration, the seal is made of a plastic and both the head and the pin are made of a metal. As described, the plastic is in particular more elastic than the metal.

In one suitable configuration, the head is made in one piece and consists of a single material; i.e. the head is monolithic. The head thus comprises an upper side which abuts the seal and a lower side which abuts the sealing seat in the end position. The upper side is accordingly preferably flat, in particular configured as a plate, whereas the lower side is convex, in particular spherical or conical. The lower side thus comprises a spherical section or a conical section, in particular a half-sphere or a cone or a truncated cone, which extends downward and into the interior of the bore. The spherical or conical section has a diameter that corresponds to the diameter of the head or is alternatively smaller, so that an additional ring is formed on the lower side around the spherical or conical section. It is in particular essential that the diameter of the spherical or conical section is larger than the inner diameter of the sealing seat. Measured in axial direction, the spherical or conical section is preferably ½ to 2 times as long as the plate. The one-piece design is advantageous, because the number of parts of the sealing piston is particularly small and the head as a whole is also guided particularly well in the bore and is thus optimally inserted into the sealing seat during clamping.

As an alternative to the one-piece design, the head in a likewise suitable configuration is formed in two parts and comprises a plate and a ball. The plate adjoins the seal with a first side and further comprises a second side, which is opposite to the first side and against which the ball abuts at least in the end position, so that it is pressed into the sealing seat. It is in particular important that the ball has a diameter that is larger than the inner diameter of the sealing seat. Measured in axial direction, the ball is preferably ½ to 2 times as long as the plate. When viewed in the axial direction, the plate is disposed between the seal and the ball. The ball is either attached to the plate or is loose and therefore movable relative to the plate. It is in particular essential that the punctiform transfer of force of the ball is not transferred to the seal in a punctiform manner, but rather that the plate, as a mediator so to speak, transfers the pressure from the ball over a large area to the seal. Accordingly, as described above, the plate is advantageously made of a rigid material, as is the ball. This two-part design is advantageous because only simple parts are used, namely a ball and a plate, which is, for example, a disc or a cylinder. The explanations relating to the plate with a ball also apply analogously to a configuration, in which the head is formed in two parts and comprises a plate and a cone or truncated cone instead of a ball. In the case of a two-part design of the head, however, the variant with a ball is preferred.

The sealing piston has a length, which is the sum of the respective lengths of the pin, the seal and the head. The sealing piston furthermore has a diameter which correspondingly results from the respective diameter of pin, the seal and the head, wherein the maximum diameter is in particular given by the seal, specifically its sealing lip. The lengths and diameters, i.e. the dimensions of the sealing piston and its individual parts in general, depend on the specific application and the dimensioning of the tool mount. In one exemplary embodiment, the pin is once to twice as long as the seal and the seal is once to twice as long as the head, depending on whether a whole ball or only a spherical section (or cone or conical section) is provided. The sealing lip has a length that is 10% to 30% of the length of the seal as a whole. The diameter and the overall length of the sealing piston are in particular in the range of a few to several millimeters. The inner diameter of the sealing seat and also the diameter of the bore are configured accordingly.

An actuator is expediently disposed in the bore for moving the sealing piston. The actuator is a screw, for example, as already described above. The actuator exerts a pressure on the pin and thus on the entire sealing piston, allowing it to be moved into the bore. The pressure from the pressure chamber acts from the other side, so that the sealing piston is pushed out of the bore by loosening the actuator. The bore preferably comprises an actuator stop for the actuator and the seal is configured to be so compressible that, in the end position of the sealing piston, the actuator can still be inserted all the way to the actuator stop. This provides a certain amount of tolerance for pressing the head against the sealing seat. When the tool mount is being clamped, the actuator and the sealing piston are first moved inward in the bore until the head hits the sealing seat. The actuator can then be moved in even further to the actuator stop. The head is already in the end position, however, and only the seal is being compressed and the pin is accordingly moved in further. The actuator stop is, for example, configured as a ring-shaped and chamfered step within the bore. The actuator has a corresponding front side, which hits the actuator stop when it is moved in.

In one useful configuration, the seal is connected in a form-locking manner to the pin or to the head or to both via a respective plug-in coupling. As a result, the individual parts of the sealing piston are captively connected to one another. This also ensures optimal guidance when being moved in the bore. The pin and the head each comprise a projection, for example, which are inserted into a respective complementary recess in the seal. In cross-section along the axial direction, the seal then has an H-shaped cross-section. The contact surfaces of the pin and the head are both ring-shaped. However, it is also advantageous to have a design without a plug-in coupling, in which the contact surfaces are perpendicular to the axial direction, preferably flat, across the entire cross-section, so that the head, the seal and the pin just abut one another and are not plugged together.

In addition to the bore for the sealing piston, the tool mount in one preferred configuration comprises a separate filling bore and a ball seal for closing the filling bore. The filling bore is used to fill the pressure chamber with fluid and is otherwise in particular closed in a pressure-tight manner, namely by means of the ball seal. The ball seal is in particular configured similarly to the head of the sealing piston. The ball seal comprises a ball, which abuts a sealing seat of the filling bore to the inside and thus closes it. The ball is pressed against the sealing seat via a further actuator, in particular by a screw that is seated in a thread of the filling bore. In contrast to the sealing piston, however, in the filling bore the actuator acts directly on the ball without an additional seal made of an elastic material being disposed in between.

BRIEF DESCRIPTION OF THE DRAWINGS

Design examples of the invention are explained in more detail in the following with the aid of a drawing. The figures show schematically.

DETAILED DESCRIPTION

Figure 1:
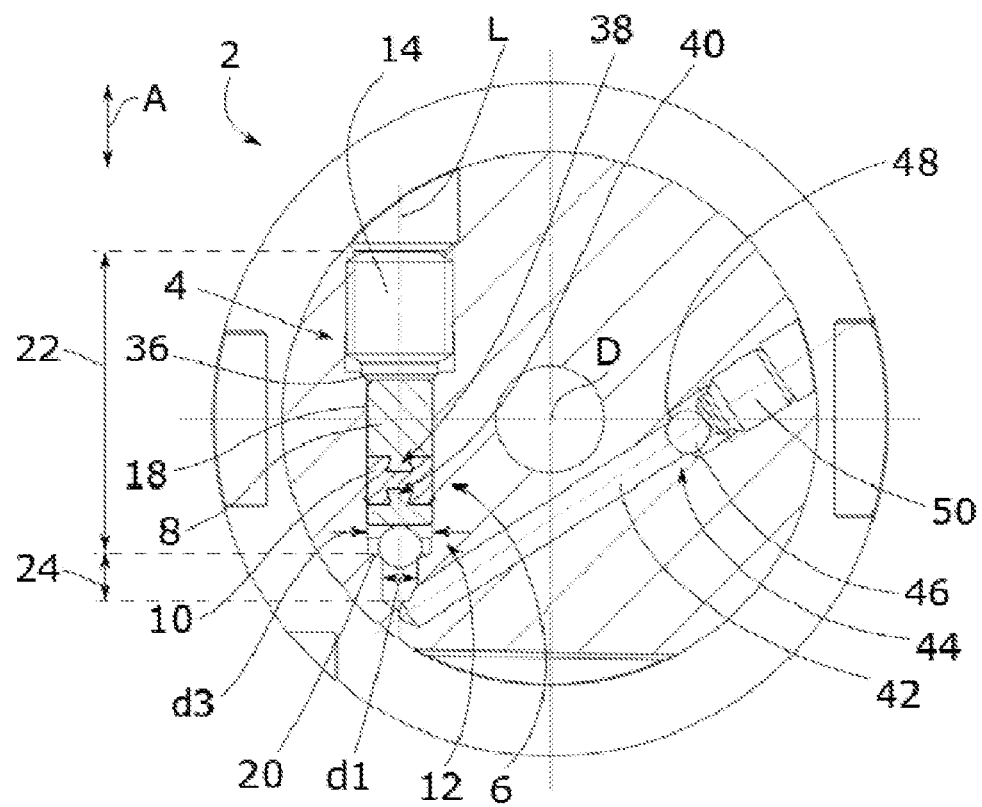
FIG. 1 a tool mount with a sealing piston,
FIG. 2 the sealing piston of FIG. 1 in a detail view,
FIG. 3 a variant of the sealing piston of FIG. 1,
FIG. 4 a further variant of the sealing piston of FIG. 1.

FIG. 1 shows a hydraulic tool mount 2 in a cross-sectional view perpendicular to an axis of rotation D. The tool mount 2 here is specifically an expansion chuck. The tool mount 2 comprises a bore 4, which extends in an axial direction A and along a longitudinal axis L. The cross-sectional view in FIG. 1 is also a sectional view along the longitudinal axis L. A sealing piston 6 is inserted in the bore 4. Two design examples for the sealing piston 6 are shown in detail in FIGS. 2 to 4.

The sealing piston 6 seals a pressure chamber, which is not depicted in more detail and is hydraulically connected with the bore 4, from the environment. The sealing piston 6 can be moved in the bore 4 in axial direction A, as a result of which, depending on the direction, the tool mount 2 can be clamped and released. The sealing piston 6 comprises a pin 8, a seal 10 and a head 12 which are arranged one behind the other in an axial direction A and thus form a stack. The pin 8, the seal 10 and the head 12 all extend along the longitudinal axis L, and are preferably rotationally symmetric with respect to this axis. The pin 8, the seal 10 and the head 12 are arranged directly one behind the other, so that both the head 12 and the pin 9 abut the seal 10 on opposite sides thereof.

The pin 8 is used to actuate the sealing piston 6 from the outside by means of an actuating element 14, which is also seated in the bore 4 and in this case is a screw that is seated in a corresponding thread. The actuator 14 presses on the pin 8 so that the sealing piston 6 can be moved in and out.

The seal 10 comprises a circumferential sealing lip 16 for abutment and sealing against an inner wall 18 of the bore 4 in order to achieve a first sealing effect. The sealing lip 16 here is ring-shaped and protrudes in radial direction R relative to the rest of the sealing head 6, i.e. perpendicular to the axial direction A. In the inserted state, the sealing lip 16 abuts the inner wall 18 and drags along the inner wall when the sealing piston 6 is moved, so that overall the first sealing effect results. The sealing lip 16 shown here as an example is wedge-shaped, but other profiles are suitable as well.

In the present case, the bore 4 comprises a sealing seat 20 which, when the sealing piston 6 is inserted, forms a stop for the head 12 in axial direction A, so that, in an end position of the sealing piston 6, the head 12 abuts the sealing seat 20 as shown in FIG. 1 and thereby closes the bore 4 in order to achieve a second sealing effect. When the sealing piston 6 is inserted, the sealing piston as a whole is moved inward until the head 12 hits the sealing seat 20. It is not possible to move the head 12 beyond the sealing seat 20. The head 12 then closes the bore 4 at the level of the sealing seat 20, thus relieving the load on the seal 10.

A double sealing effect is then achieved by the seal 10, which abuts the inner wall 18, in combination with an additional seal, namely the head 12 which abuts the sealing seat 20. In the end position shown in FIG. 1, the pressure of the pressure chamber is completely on the head 12 and the load on the seal 10 is completely relieved. In the clamped state, i.e. while a tool or workpiece is being clamped or unclamped, the seal 10 is free of pressure.

In the design example shown, the sealing seat 20 is formed as a result of the fact that the bore 4 comprises an outer section 22 in which the sealing piston 6 is seated and an inner section 24 that is tapered relative to the outer section 22 and thus has a diameter d1 that is smaller than a diameter d2 of the head 12. The bore 4 as a whole is therefore tapered and has a step that forms the sealing seat 20. In the present case, the sealing seat 20 and also the inner section 24 overall have a diameter d1 (i.e. inner diameter) that is at least 50% and at most 80% of the diameter d3 of the outer section 24.

The sealing seat 20 in FIG. 1 is ring-shaped and the front of the head 12 is spherical so that, in the end position, the head 12 rests in the sealing seat 20 in a form-locking manner. The sealing seat 20 in the design example in FIG. 1 is therefore funnel-shaped or cone-shaped and extends obliquely inward. As can be seen specifically in FIGS. 2 to 4, the back of the head 12 in the embodiments shown here is plate-shaped and has a flat contact surface 28 that abuts the seal 10, and here also extends perpendicular to the axial direction. This advantageously results in a distribution of the force from the front of the spherical or conical head 12 to the seal 10 over a large area. In addition, the pin 8 analogously also comprises a flat contact surface 26 that abuts the seal 10, so that the seal is enclosed on both sides by the pin 8 and head 12 and pinched between two respectively flat contact surfaces 26, 28. The seal 10 likewise comprises not further specified contact surfaces that are configured to be complementary to the contact surfaces 26, 28 of the pin 8 and the head 12.

In the present case, the seal 10 consists of an elastic material, in particular a plastic, so that the seal 10 adapts optimally to the bore 4 and thereby seals the pressure chamber. The seal 10 here is also manufactured in one piece, i.e. monolithic.

On the other hand, the head 12 in the present case consists of a rigid material, especially a metal, in particular steel, and here is also made of a similar or the same material as the inner wall 18 of the bore 4, especially the sealing seat 20 thereof. Neither the sealing seat 20 nor the head 12 are therefore made of an elastic material, but rather of a rigid material, as a result of which the seal 10 is particularly robust and wear-resistant.

The pin 8 in the present case also consists of a rigid material, especially a metal, in particular steel. The explanations relating to the head 12 also apply accordingly to the pin 8. The pin here is a simple cylinder and is manufactured in one piece, i.e. monolithic.

The head 12 and the pin 8 are manufactured with play in relation to the bore 4, so that both can be moved along the bore 4 with as little friction as possible, but still in a guided manner.

In the design examples shown, the seal 10 is made of a material, the elasticity of which is greater than that of the pin 8 and the head 12. Therefore, when clamping the tool mount 2, the seal 10 is primarily compressed and squeezed between the pin 8 and the head 12. Because the seal 10 is elastic in comparison to the head 12 and the pin 8, the length l1 of the sealing piston 6 is variable; i.e. the elastic seal 10 absorbs tolerances that result from the production of the sealing piston 6 and the bore 4.

Figure 2:
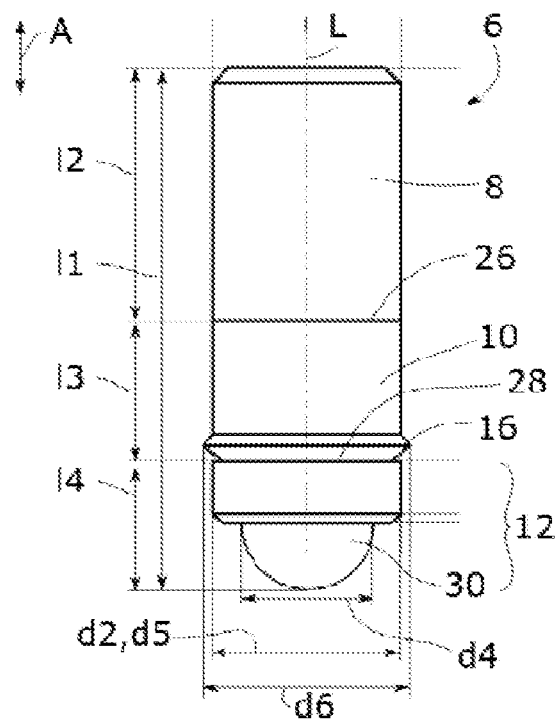
Figure 3:
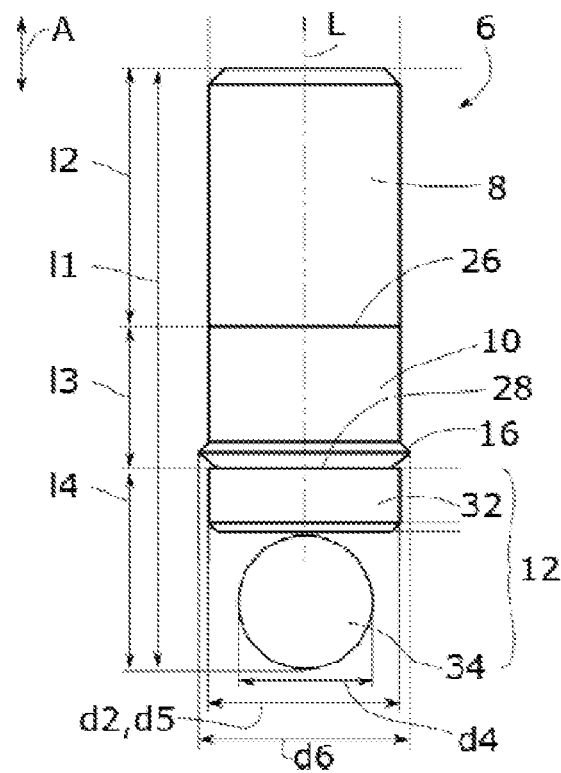
Figure 4:
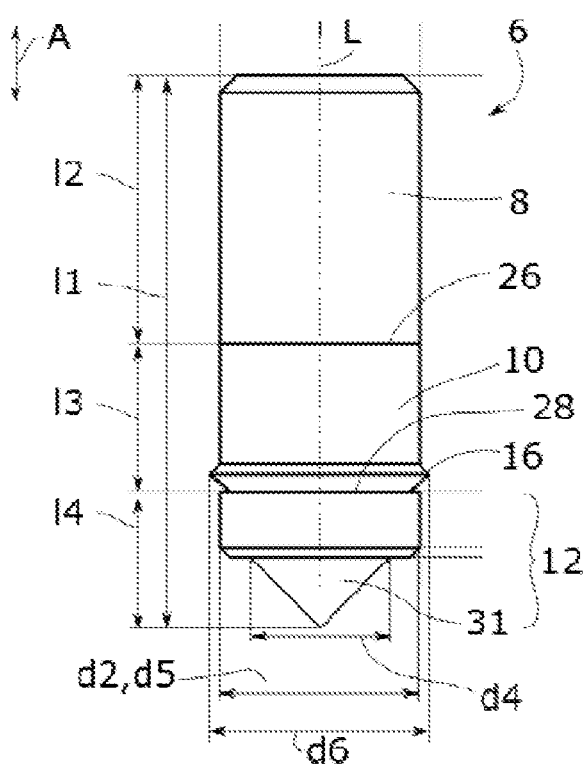

FIGS. 2 to 4 each show a variant of the sealing piston 6 in a lateral view. In the respective design example of FIGS. 2 and 4, the head 12 is made in one piece and consists of a single material; i.e. the head 12 is monolithic. The head 12 thus comprises an upper side which abuts the seal 10 and a lower side which abuts the sealing seat 20 in the end position. The upper side is therefore preferably flat, whereas the lower side is convex, spherical in FIG. 2 and conical in FIG. 4. The lower side in FIG. 2 accordingly has a spherical section 30; here specifically a half-sphere that extends downward. The lower side in FIG. 4 analogously has a conical section 31, which extends downward. The spherical section 30 and the conical section 31 have a diameter d4 that corresponds to the diameter d2 of the head 12 or alternatively, as shown here, is smaller, so that an additional ring is formed on the lower side around the spherical section 30 or the conical section 31. It is in particular essential that the diameter d4 of the spherical section 30 or conical section 31 is larger than the inner diameter d1 of the sealing seat 20.

In the design example of FIG. 3 on the other hand, the head 12 is formed in two parts and comprises a plate 32 and a ball 34. The plate 32 adjoins the seal 10 with a first side and further comprises a second side, which is opposite to the first side and against which the ball 34 abuts in the end position, so that it is pressed into the sealing seat 20. The ball 34 has a diameter d4 that is larger than the inner diameter d1 of the sealing seat 20. When viewed in the axial direction A, the plate 32 is disposed between the seal 10 and the ball 34. The ball 34 is either attached to the plate 32 or is loose and therefore movable relative to the plate 32. The plate 32 transfers the punctiform transfer of force of the ball 34 to the seal 10 in a planar manner. The explanations apply accordingly to a not explicitly shown embodiment, in which the head 12 comprises a cone instead of the ball 34, e.g. a real cone with a point or a truncated cone.

The sealing piston 6 has a length l1, which is the sum of the respective lengths l2, l3, l4 of the pin 8, the seal 10 and the head 12. The sealing piston 6 furthermore has a diameter which correspondingly results from the respective diameter d5, d6, d2 of pin 8, the seal 10 and the head 12, wherein the maximum diameter is given by the seal 10, specifically its sealing lip 16. The actual lengths l1, l2, l3, l4 and diameters d2, d5, d6, i.e. the dimensions of the sealing piston 6 and its individual parts in general, depend on the specific application and the dimensioning of the tool mount 2.

The actuator 14, which is shown in FIG. 1, is used to move the sealing piston 6 as described. In the design example shown in FIG. 1, the bore 4 comprises an additional actuator stop 36 for the actuator 14 and the seal 10 is configured to be so compressible that, in the end position of the sealing piston 6, the actuator 14 can still be inserted all the way to the actuator stop 36 as shown in FIG. 1. This provides a certain amount of tolerance for pressing the head 12 against the sealing seat 20. When the tool mount 2 is being clamped, the actuator 14 and the sealing piston 6 are first moved inward in the bore 4 until the head 12 hits the sealing seat 20. The actuator 14 can then be moved in even further to the actuator stop 36. The head 12 is already in the end position, however, and only the seal 10 is being compressed and the pin 8 is accordingly moved in further. In FIG. 1, the actuator stop 36 is configured as a ring-shaped and chamfered step within the bore 4 and the actuator 14 has a corresponding front side, which hits the actuator stop 36 when it is moved in.

In the design example shown in FIG. 1, the seal 10 is connected in a form-locking manner to the pin 8 or to the head 12 via a respective plug-in coupling 38, 40. As a result, the individual parts of the sealing piston 6 are captively connected to one another and optimal guidance when being moved in the bore is ensured. As shown, the pin 8 and the head 12 each comprise a projection, for example, which are inserted into a respective complementary recess in the seal 10. In cross-section along the axial direction A, the seal 10 then has an H-shaped cross-section. The contact surfaces 26, 28 of the pin 8 and the head 12 are both ring-shaped. In a not depicted variant there is no plug-in coupling 38, 40, so that the contact surfaces 26, 28 are perpendicular to the axial direction A, and for example completely flat, across the entire cross-section, and the head, the seal and the pin just abut one another.

In addition to the bore 4 for the sealing piston 6, the tool mount 2 shown as an example comprises a separate filling bore 42 and a ball seal 44 for closing the filling bore 42. The filling bore 42 is used to fill the pressure chamber with fluid and is otherwise closed in a pressure-tight manner by means of the ball seal 44. The ball seal 44 is configured similarly to the head 12 of the sealing piston 6 and comprises a ball 46, which abuts a sealing seat 48 of the filling bore 42 to the inside and thus closes it. The ball 46 is pressed against the sealing seat 48 via a further actuator 50. In contrast to the sealing piston 6, however, in the filling bore 42 the actuator 50 acts directly on the ball 46 without an additional seal made of an elastic material being disposed in between.

The invention claimed is:

1. A sealing piston for a hydraulic tool mount, comprising a pin, a seal and a head which are arranged one behind the other in an axial direction (A) and thus form a stack, wherein the seal comprises a circumferential sealing lip for abutment and sealing against an inner wall of a bore of the hydraulic tool mount in order to achieve a first sealing effect, wherein the bore comprises an outer section in which the sealing piston is seated and an inner section that is tapered relative to the outer section, and thus has a diameter (d1) that is smaller than a diameter (d2) of the head, wherein the head is stopped by and abuts a sealing seat of the bore of the hydraulic tool mount, thereby closing an opening of the inner section of the bore in order to achieve a second sealing effect, wherein the head comprises a plate and a ball,
wherein the plate is disposed between the seal and the ball such that the ball is pressed into the sealing seat when in an end position.

2. The sealing piston according to claim 1, wherein the sealing seat is ring-shaped and the front of the head is configured such that, in the end position, the head rests in the sealing seat in a form-locking manner.

3. The sealing piston according to claim 1, wherein the front of the head is spherical or cone-shaped, for form-locking abutment on the sealing seat in the end position.

4. The sealing piston according to claim 1, wherein the seal is made of a material, the elasticity of which is greater than that of the pin and the head.

5. The sealing piston according to claim 1, wherein the seal is made of a plastic and both the head and the pin are made of a metal.

6. The sealing piston according to claim 1, wherein the head is made of a unitary construction and consists of a single material.

7. The sealing piston according to claim 1, wherein the seal is connected in a form-locking manner to the pin or to the head or to both by means of a plug-in coupling.

8. A hydraulic tool mount comprising a bore for receiving the sealing piston as recited in claim 1.

9. The hydraulic tool mount according to claim 8, further comprising a separate filling bore and a ball seat for closing the filling bore.

10. The hydraulic tool mount according to claim 8, further comprising an actuator disposed in the bore for moving the sealing piston, wherein the bore comprises an actuator stop for the actuator, and wherein the seal is configured to be so compressible that, in the end position of the sealing piston, the actuator can still be inserted all the way to the actuator stop.

11. The hydraulic tool mount according to claim 8, wherein the bore comprises an outer section in which the sealing piston is seated and an inner section that is tapered relative to the outer section, and thus has a diameter (d1) that is smaller than a diameter (d2) of the head.

12. The sealing piston according to claim 1, wherein the head comprises a plate and a spherical section.

13. The sealing piston according to claim 12, wherein the plate is disposed between the seal and the spherical section such that the spherical section is pressed into the sealing seat when in an end position.

14. The sealing piston according to claim 1, wherein the head comprises a plate and a conical section.

15. The sealing piston according to claim 14, wherein the plate is disposed between the seal and the conical section such that the conical section is pressed into the sealing seat when in an end position.

* * * * *